United States Patent
Bhola et al.

(10) Patent No.: US 10,033,072 B2
(45) Date of Patent: Jul. 24, 2018

(54) FLUID-COOLED BATTERY MODULE CONTAINING BATTERY CELLS

(71) Applicant: ELECTROVAYA INC., Mississauga (CA)

(72) Inventors: Rakesh Bhola, Mississauga (CA); Rajshekar Das Gupta, Toronto (CA)

(73) Assignee: ELECTROVAYA INC., Mississauga (CA)

( * ) Notice: Subject to any disclaimer, the term of this patent is extended or adjusted under 35 U.S.C. 154(b) by 473 days.

(21) Appl. No.: 14/370,750

(22) PCT Filed: Jan. 7, 2013

(86) PCT No.: PCT/CA2013/000005
§ 371 (c)(1),
(2) Date: Jul. 3, 2014

(87) PCT Pub. No.: WO2013/102268
PCT Pub. Date: Jul. 11, 2013

(65) Prior Publication Data
US 2014/0342195 A1    Nov. 20, 2014

Related U.S. Application Data

(60) Provisional application No. 61/631,455, filed on Jan. 5, 2012.

(51) Int. Cl.
*H01M 10/656*    (2014.01)
*H01M 2/10*    (2006.01)
(Continued)

(52) U.S. Cl.
CPC ..... *H01M 10/5061* (2013.01); *H01M 2/0217* (2013.01); *H01M 2/1077* (2013.01);
(Continued)

(58) Field of Classification Search
CPC ............. H01M 2/1077; H01M 2/0217; H01M 10/5061; H01M 10/625; H01M 10/663;
(Continued)

(56) References Cited

U.S. PATENT DOCUMENTS

| 5,141,826 A | 8/1992 | Böhm et al. |
| 5,756,227 A | 5/1998 | Suzuki et al. |

(Continued)

FOREIGN PATENT DOCUMENTS

| EP | 2 337 143 A2 | 6/2011 |
| GB | 776240 A | 6/1957 |

(Continued)

OTHER PUBLICATIONS

PCT Notification Concerning Transmittal of International Preliminary Report on Patentability (Chapter I of the Patent Cooperation Treaty) for counterpart PCT Application No. PCT/CA2013/000005, 6 pp., (dated Jul. 17, 2014).

(Continued)

*Primary Examiner* — Jane Rhee
(74) *Attorney, Agent, or Firm* — McAndrews, Held & Malloy, Ltd.

(57) ABSTRACT

A battery module for receiving battery cells provides cooling through a cooling fluid. Chilled fluid travels first to the hottest part of the battery module and then continues to gradually less hot areas. As the chilled cooling fluid absorbs heat and travels to cooler parts of the battery module, the heat transfer between the fluid and the battery cells decreases because the temperature differential between the cells and cooling fluid decreases, providing a more even temperature distribution across the battery module. The cooling fluid may be contained in a conduit associated with one or more cooling plates. A plurality of slots provide a precise mechanical support for each battery cell, increasing (Continued)

the heat conduction from the cell to the battery module, protecting the battery module from vibration and decreasing contamination in case of thermal runaway or other damage to the cells.

21 Claims, 4 Drawing Sheets

(51) Int. Cl.
    *H01M 10/625* (2014.01)
    *H01M 10/663* (2014.01)
    *H01M 10/647* (2014.01)
    *H01M 10/6568* (2014.01)
    *H01M 10/613* (2014.01)
    *H01M 10/6556* (2014.01)
    *H01M 10/6555* (2014.01)
    *H01M 10/617* (2014.01)
    *H01M 10/0525* (2010.01)
    *H01M 2/02* (2006.01)

(52) U.S. Cl.
    CPC ....... *H01M 10/613* (2015.04); *H01M 10/617* (2015.04); *H01M 10/625* (2015.04); *H01M 10/647* (2015.04); *H01M 10/6555* (2015.04); *H01M 10/6556* (2015.04); *H01M 10/6568* (2015.04); *H01M 10/663* (2015.04); *H01M 10/0525* (2013.01); *H01M 2002/0205* (2013.01); *H01M 2220/10* (2013.01); *H01M 2220/20* (2013.01); *Y02E 60/122* (2013.01)

(58) Field of Classification Search
    CPC ........... H01M 10/647; H01M 10/6568; H01M 10/613; H01M 10/6556; H01M 10/617; H01M 10/0525; H01M 2220/10; H01M 2220/20; H01M 2002/0205
    See application file for complete search history.

(56) References Cited

U.S. PATENT DOCUMENTS

| | | |
|---|---|---|
| 6,512,347 B1 | 1/2003 | Hellmann et al. |
| 7,968,223 B2 | 6/2011 | Lee et al. |
| 8,003,245 B2 | 8/2011 | Lee et al. |
| 8,006,626 B2 | 8/2011 | Kumar et al. |
| 2003/0211384 A1 | 11/2003 | Hamada et al. |
| 2006/0080986 A1 | 4/2006 | Inoue |
| 2007/0102213 A1 | 5/2007 | Seo et al. |
| 2009/0142653 A1 | 6/2009 | Okada et al. |
| 2011/0206964 A1 | 8/2011 | Odumodu et al. |
| 2011/0206966 A1 | 8/2011 | Schmid et al. |

FOREIGN PATENT DOCUMENTS

| | | |
|---|---|---|
| JP | 2004006089 A | 1/2004 |
| WO | WO 2005/043650 A2 | 5/2005 |
| WO | WO 2010/135456 A2 | 11/2010 |
| WO | WO 2011/047067 A2 | 4/2011 |

OTHER PUBLICATIONS

European Patent Office Communication enclosing Extended European Search Report for corresponding European Patent Application No. 13733932.1, 14 pp., (dated Jun. 18, 2015).

PCT Notification of Transmittal of the International Search Report and the Written Opinion of the International Searching Authority, or the Declaration for PCT Counterpart Application No. PCT/CA2013/000005, 8 pgs., (dated Apr. 3, 2013).

European Search Report for European Patent Application No. 13733932.1-1359, dated Mar. 11, 2016; 14 pages.

European Patent Office, "Communication pursuant to Article 94(3) EPC", issued in connection with EP Application No. 13733932.1, dated Jan. 4, 2017, 9 pages.

FLUID-COOLED BATTERY MODULE CONTAINING BATTERY CELLS

CROSS-REFERENCE TO RELATED APPLICATIONS

This patent application is a U.S. National Phase Application under 35 U.S.C. § 371 of International Application No. PCT/CA2013/000005, filed 7 Jan. 2013, entitled FLUID-COOLED BATTERY MODULE CONTAINING BATTERY CELLS, which claims the benefit of 35 USC 119(e) to U.S. Provisional Application Ser. No. 61/631,455, filed 5 Jan. 2012.

FIELD OF THE INVENTION

The present invention relates to battery modules for battery cells. More particularly, the present invention relates to the thermal management of battery modules.

BACKGROUND OF THE INVENTION

Batteries have been proposed as a clean, efficient and environmentally responsible power source for electric vehicles, and various other applications. They are also becoming more popular for large-scale energy storage, providing frequency regulation or auxiliary power to the power grid and allowing better use of intermittent power generation from sources like wind turbines and solar panels.

Battery cells, and in particular, lithium ion cells, are known to generate heat when charging or discharging. Overheating or an exposure to high temperatures may undesirably affect the functioning and lifespan of a battery system. Thus battery systems typically employ some form of cooling system.

Many systems use some form of air cooling, mainly due to convenience. These are shown, for instance, in U.S. published application 2003/0211384 published Nov. 13, 2003, U.S. published application 2006/0080986A1 published Apr. 20, 2006 and U.S. published application 2007/0102213 published May 10, 2007 incorporated herein by reference. An additional benefit of these cooling systems is that air is not electrically conducting and as such will not cause short circuits. However, air has a low thermal conductivity and a low heat capacity; thus air cooling systems exhibit inadequate efficiency for use with larger batteries.

Another common setup is to include tubes or channels to conduct a cooling fluid between the individual cells in a battery module. Because aqueous fluids are most commonly used, and aqueous fluids are generally conductive, leaks in these systems can be very damaging to the battery system. To ensure fluid-tight joining of the parts and components and to minimize susceptibility to leakage, processes and equipment used to assemble this type of cooling system are highly automated, complex, and have costs for manufacture and maintenance.

An additional concern is the temperature distribution throughout a cell or battery module. Cell temperature affects charging efficiency and capacity; lower capacity can lead to over-discharging, which will lower the operational lifespan of the cell and the battery as a whole. Batteries with greater temperature uniformity tend to operate more efficiently and have longer operating lives.

A further difficulty with larger electric chemical battery cells is that different parts of the batteries themselves may have different localized temperatures. This is the case for a number of reasons including the physical size of the cells themselves, the poor thermal conductivity within the cells themselves, and the fact that some sections of the cells may generate more heat than other sections. In other words, specific parts of the cells may have different localized temperatures requiring different cooling to avoid undesirable effects.

Therefore, there is a need in the art for a battery module which efficiently removes heat from the battery cells and produces a more uniform temperature distribution amongst the battery cells, while providing the necessary functionality with respect to containment and protection.

SUMMARY OF THE INVENTION

It is an object of this invention to at least partially overcome some of the disadvantages of the prior art. Also, it is an object of at least one aspect of this invention to provide an improved type of a battery module and case therefor which contains at least one battery cell, and at least one conduit carrying a cooling fluid to cool the at least one cell. The conduit is in thermal contact with the battery cells to cool them. The conduit may be associated with a cooling plate and either contained therein, or integrally formed therewith, or may be in thermal contact with the cooling plate, but contained external thereof.

Accordingly, in one aspect, the present invention provides a system for cooling a battery module having a plurality of individual battery cells, each cell having electrical terminals at an electrical connecting end, said system comprising: a plurality of substantially parallel thermally conductive slots, each of said slots extending generally in a lateral direction for holding said battery cells in an inserted position with the connecting ends aligned with the connecting end of each other battery cell in a longitudinal direction and at a first portion of the battery module; a cooling conduit extending along the longitudinal direction, said conduit having an inlet for receiving chilled coolant and an inlet portion substantially adjacent the inlet, said cooling conduit in thermal contact with said cells; wherein the inlet portion extends in the longitudinal direction across the plurality of slots and coincident with the first portion of the battery module so as to cool the connecting ends of each of the battery cells before cooling other portions of the battery cells.

In a further aspect, the present invention provides a battery module comprising: a plurality of battery cells, each battery cell substantially rectangularly shaped with electrical terminals at a first connecting end, which is opposite a second opposed end; a cell support for holding said battery cells in an inserted position with the connecting ends of the cells aligned in a longitudinal direction and extending along a lateral direction; a cooling conduit having an inlet for receiving chilled coolant, said cooling conduit in thermal contact with said cells; wherein the cooling conduit has an inlet portion substantially adjacent the inlet and extending in the longitudinal direction proximate the connecting end of the cells to cool the connecting end of the battery cells before cooling other portions of the cells.

In a still further aspect, the present invention provides a case for containing individual battery cells, each battery cell having electrical terminals at an electrical connecting end and opposed end opposite the connecting end, said case comprising: at least one cooling plate in thermal contact with a corresponding cooling conduit, said cooling conduit having an inlet portion near an inlet for receiving chilled cooling fluid; a cell support for receiving and supporting the battery cells in an inserted position with the connecting end of each battery cell aligned with the connecting end of each other battery cell and coincident with the first portion of the case; wherein the first portion of the case coincides with the inlet portion of the cooling conduit so as to cool the first portion of the case before cooling other portions of the case.

In a further aspect, the present invention provides a method of managing heat generated by a battery module, said method comprising: orienting a plurality of battery cells in an inserted position with the connected end having the electrical terminals for the battery cell aligned with each other and coincident with a first portion of the battery module; and providing a chilled coolant initially to the first portion of the battery module before cooling other portions of the battery module.

In order to provide a more uniform temperature distribution, chilled cooling fluid travels preferably first to the hottest area of the battery module. The hottest area will generally be where the terminals of the cells are located. In one aspect of the invention, the battery cells, when in the inserted position, are arranged such that the terminals are all near the first portion of the battery module and this coincides with the initial portion of the cooling conduit. The initial portion of the cooling conduit is the portion closest to the inlet for the cooling fluid and therefore, the cooling fluid is at its coldest. Heat transfer will occur at the greatest rate at the first portion because the fluid is at its coldest and also because the first portion of the battery module will be the hottest due to the orientation of the battery cells. A larger differential in temperature between the battery module and the cooling fluid would increase the heat transfer thereby providing increased cooling to the portion of the battery module requiring it the most. As the fluid moves along the path of the conduit towards the less hot areas of the battery module, the fluid becomes warmer from the heat absorbed. Also, the less hot portions of the module are at a lower temperature. Thus, the rate of heat transfer slows given that the temperature differential between the cooling fluid and the module is less. Thus, more heat is absorbed by the cooling fluid in the hotter areas and less heat is absorbed by the cooling fluid at the other areas, thereby leading to a more uniform temperature distribution in the battery module even in cases where the battery cells and/or the corresponding battery module is larger and/or has different temperatures.

In one aspect, the present invention is used in applications where thermal management may be critical, such as large lithium ion battery cells, such as those used in electric vehicles. Similarly, large lithium battery cells are also used in grid energy storage. It is understood, however, that the present invention can be used in other applications where large battery cells may be needed.

In the particular embodiment where the battery cells are used in electric vehicle applications, the present invention could share components of the vehicle's existing air conditioning system to cool the cooling fluid. For instance, the chilling fluid could be chilled by the air conditioning components of the vehicle prior to their introduction into the cooling conduit. Similarly, in grid energy storage applications, if other air conditioning units are used to cool the facility, or specific components within the facility, the same air conditioning components can be used to chill the cooling fluid. In other cases, separate cooling systems may be required.

In addition to cooling of the battery cells, the case of the present invention also fulfills other functions. For instance, the cells are protected from vibration and are contained in the event of damage, such as from thermal runaway. In addition, having slots which correspond to the shape of the cells increase the conduction of heat from the cells to the cooling conduit. Also, having slots which complement the shape of the cells also provides a mechanical support for each cell. In addition, in the aspect of the invention where the cells are contained in slots which are then located in a case, there is added protection from potential leakage of the cooling fluid and in the event of damage to the cells.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1:
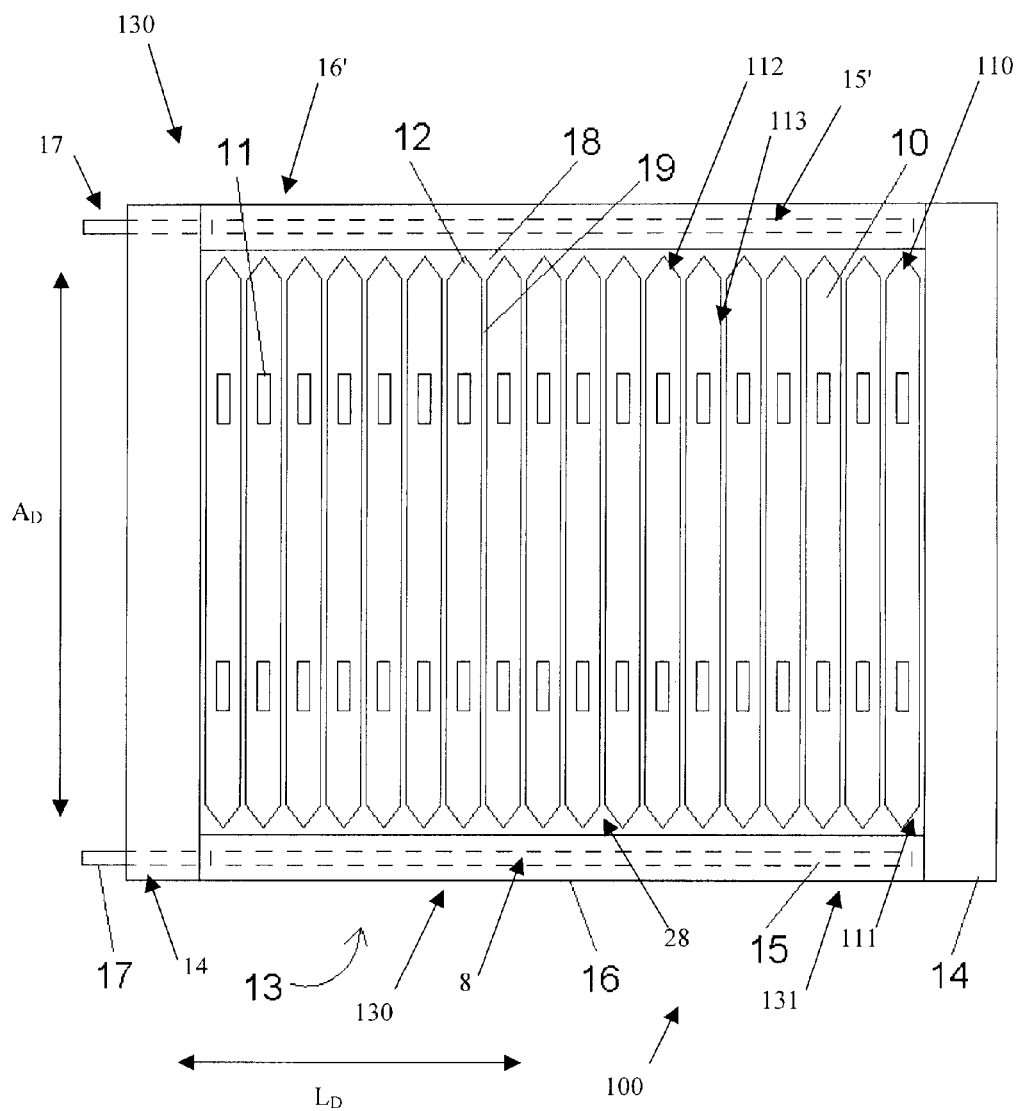
FIG. 1 is a top view of one embodiment of the invention, displaying the conduit embedded in a cooling plate according to one embodiment of the present invention.
Figure 2:
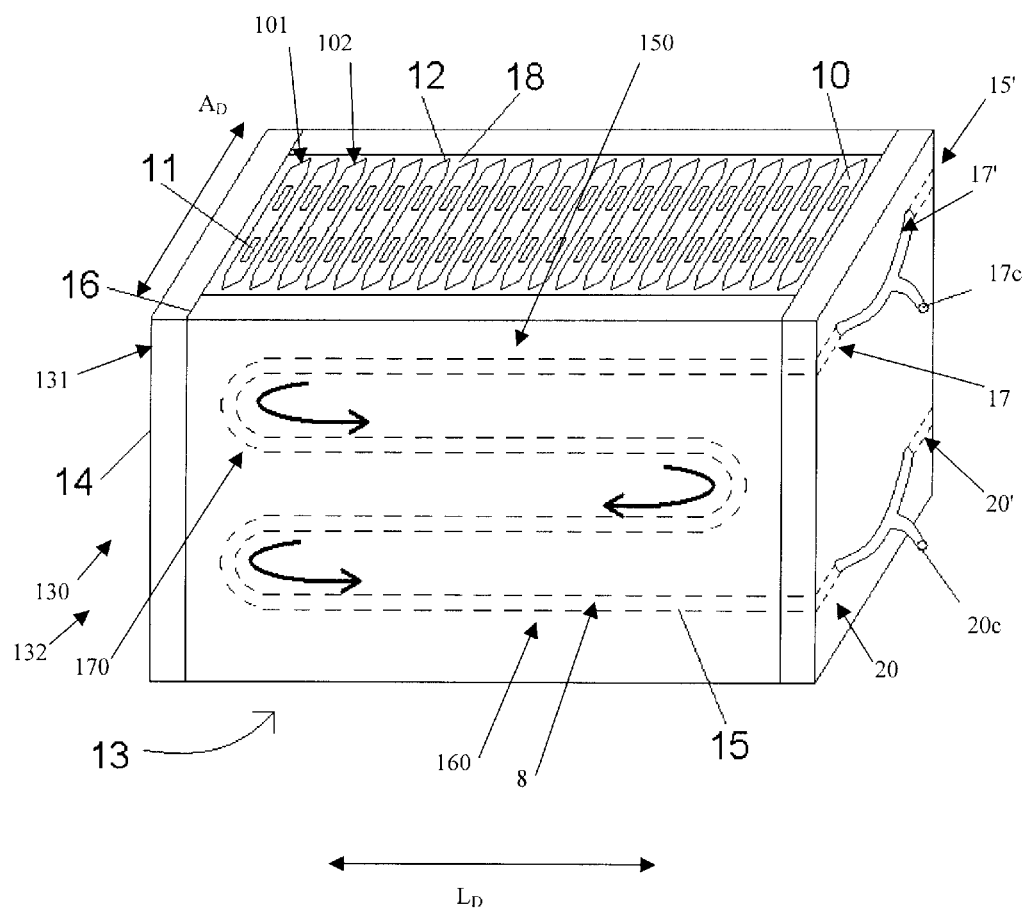
FIG. 2 is a perspective view of a further embodiment of the invention.

As illustrated in FIG. 1, in one embodiment of the present invention, one, and preferably a plurality of battery cells, shown generally by reference numeral 10, are contained within a battery module, shown generally by reference numeral 130. The battery module 130 preferably is formed of a battery module case 13, as shown in FIGS. 1 and 2. In a preferred embodiment, the battery module case 13 is preferably in the shape of a rectangular prism, having two longer sides along a longitudinal direction $L_D$ and two shorter sides along a lateral direction $A_D$. The longer sides, in a preferred embodiment, are formed by cooling plates, as shown generally by reference numeral 16, and the two shorter sides in a preferred embodiment are formed by the end plates, 14.

The cooling plates 16 are preferably composed of a heat-conducting material, preferably aluminum or ceramic. In a preferred embodiment, each cooling plate 16 contains a cooling conduit 15. The cooling conduit 15 is shown in dashed lines in FIGS. 1 and 2 illustrating that in this embodiment it is embedded within the cooling plates 16. It is understood that the conduit 15 need not necessarily be contained within or associated with the cooling plate 16 provided that the cooling conduit 15 is otherwise in thermal contact with the cells 10 contained within the battery module 130. In a preferred embodiment, the cooling conduit 15 is integrally formed within the cooling plates 16.

In a further preferred embodiment, the cooling conduit 15 is composed of a heat-conducting material, also preferably aluminum or ceramic. In one preferred embodiment, the conduit 15 is preferably a tube formed of a single piece of material, such that there are no seams or joints within the cooling plate 16 and the case 13 of the battery module 130. Also, a seamless cooling conduit 15 encased within the cooling plate 16 would minimize the risk of fluid leak in the functional containment area 101 where the cells 10 are contained. The fluid, as shown generally by reference numeral 8, flowing through the conduit 15 is preferably water or refrigerant having a relatively high heat capacity to be able to absorb heat generated by the cells 10.

Heat is generated as an undesirable byproduct when the cells 10 are charged or discharged. In a preferred embodiment, heat is drawn from the cells 10 to the cooling conduit 15, which is in thermal contact with the cells 10 contained in the functional containment area 101 of the battery module 130. In a further preferred embodiment, heat is drawn from the cells 10 to the cooling plate 16 through which the conduit 15 may be contained, and then removed from the battery module 130 by the cooling fluid 8 being expelled from the conduit 15 and replaced with new chilled coolant. It is understood that the coolant 8 may be recycled, or in some applications could be permanently discarded, such as in cases where water is used from a large body of water to cool the battery module 130. Thus, heat is removed by flowing the cooling fluid 8 through the conduit 15, and, in a preferred embodiment, through the cooling conduit 15 contained in the cooling plate 16 of the battery module case 13.

In a preferred embodiment, as illustrated in FIG. 2, the case 13 has two cooling plates 16 and 16', each shown extending along the longitudinal direction $L_D$ of the case 13 and each cooling plate having a conduit 15, 15'. Having a conduit 15, 15' located on each cooling plate 16, 16' of the battery module case 13 provides more uniform cooling to the cells 10. In one embodiment, the conduit 15 extends through the end plate 14 and outside of the battery module case 13, where it is in fluid communication with the analogous second conduit 15' extending on the second plate 16'. The conduits 15, 15' in a preferred embodiment, are substantially the same and thus only one side 16 is shown in perspective view in FIG. 2 with the second conduit 15' shown extending to the other side of the battery case 13. In a preferred embodiment, each of the first conduit 15 and second conduit 15' join with the other to form common inlet 17c from the fluid source, which in a preferred embodiment is a reservoir or air conditioner shown generally by reference numerals 42 and 43 in FIG. 4. It is understood that the precise fluid source for the chilled fluid 8 would be in the knowledge of a person skilled in the art and depend on this specific application.

Each conduit 15 and 15' also preferably joins with a common outlet, as shown generally by reference numeral 20o. In this way, each conduit 15, 15' will have an inlet 17, which may stem from a common inlet 17c, and an outlet 20, which may stem to the common outlet 20c.

Figure 3:
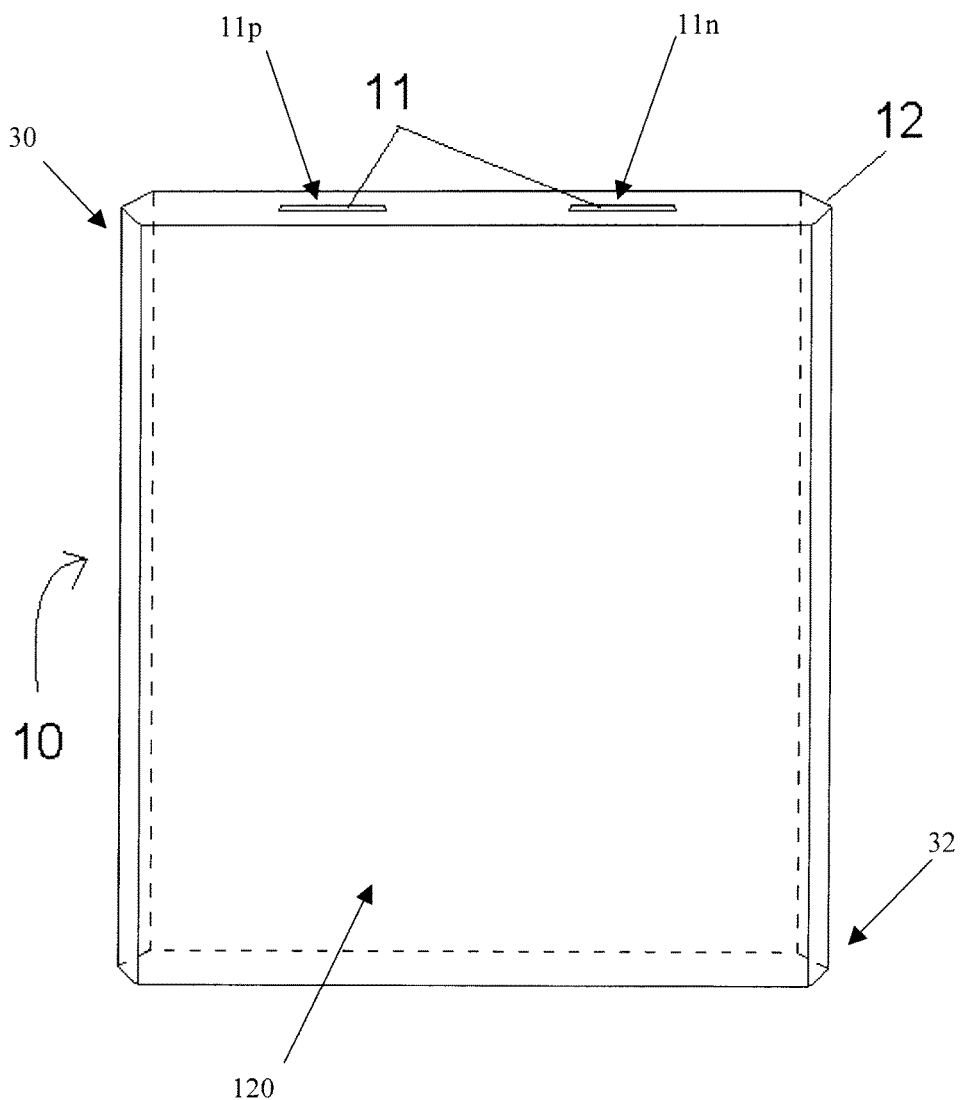
FIG. 3 is a perspective view of a cell having tapered edges according to one embodiment of the present invention.

In a preferred embodiment, the cells 10 are oriented with the terminals 11 towards the top of the case 13. As illustrated in FIG. 3, the cells 10 preferably have two terminals 11, a positive terminal 11p and a negative terminal 11n for extracting electrical energy from the cell 10 and also for recharging the cell 10. The terminals 11 are generally located at a connection end, as shown generally by reference numeral 30 of the cell 10. The end 32 opposed to the connection end 30 may still generate heat, but generally will not generate as much heat as the connection end 30.

As illustrated in FIGS. 1 and 2, the cells 10 are oriented in the functional containment area 101 in an inserted position with the connecting end 30 of the cells aligned with each other. Preferably, a cell support, shown generally by reference numeral 102 is used to support the cells 10 in the inserted postion. In this way, the connecting end 30 of each of the battery cells 10 is coincident with a first portion 131 of the battery module 130. In the preferred embodiment illustrated in FIGS. 1 and 2, the first portion 131 corresponds to the upper portion of the battery module 130. It is understood that the first portion 131 or upper portion of the battery module 130 is the portion coincident with the connecting ends 30 of the cells 10 and electrical terminals 11 and therefore the first or upper portion 131 could be the upper 50% of the battery module 130 or case 13, and more preferably is the upper 25% or 20% of the battery module 130 or case 13.

As also illustrated in FIG. 2, the initial portion 150 of the conduit 15, which is adjacent to the inlet 17 and receives the chilled coolant 8, extends along the first portion 131 of the battery module 130. In this way, the chilled coolant 8, which is initially received in the conduit 15 from the inlet 17 and is at its coolest temperature travels from the inlet 17 along the initial portion 150 of the conduit 15 coincident with the first portion 131 of the battery module 130 where the cells 10 are arranged with the connecting ends 30 aligned with each other and generate the most heat. In a preferred embodiment, where the conduit 15 is contained within the cooling plate 16, the inlet portion 150 of the conduit 15 is contained at the upper portion of the cooling plate 16. The fluid 8 then warms as it travels across the inlet portion 150, which extends along the longitudinal direction $L_D$ of the battery module 130. In this way, the maximum heat transfer occurs between the most chilled coolant 8 entering from the inlet 17 and flowing in the initial portion 150 of the conduit 15 coincident with the first portion 131 of the battery module 130 where the connecting ends 30 of the cells 10 are aligned and produce the most heat because the temperature differential is greatest between the coolant 8 and the first portion 131 of the battery module 130.

The chilled coolant 8, will then warm as it flows in the conduit 15 in that it absorbs the heat from the cells 10. The conduit 15, in a preferred embodiment, loops back and forth along the longitudinal direction $L_D$ of the battery module 130, as shown in FIG. 2. In the preferred embodiment, when the conduit 15 is contained in the cooling plate 16, the fluid gradually approaches the bottom portion of the cooling plate 16 where the opposed ends 32 of the cells 10 are contained in the battery module 130. It is understood that the opposed ends 32 of the cells 10 will generate less heat than the connecting end 30. As such, the second portion of the battery module 130, as shown generally by reference numeral 132, and in this preferred embodiment, corresponds to the bottom portion of the battery case 13, will tend to be cooler than the first portion 131 of the battery module 130 or upper portion of the plate 16 and case 13 in this embodiment.

As the second portion 132 of the battery module 130, corresponding to the bottom of the case 13 in this preferred embodiment, will be cooler because the opposed ends 32 of the cells 10 do not generate as much heat, and because the cooling fluid 8 in the outlet portion 160 has now travelled along the length of the conduit 15 to reach the outlet portion, as shown generally by reference numeral 160, less heat is transferred as compared to the first portion 131 at the top of the case 13 because the temperature differential between the fluid 8 and the second portion 132 of the module 130 is less. In this way, less heat will be transferred at the bottom portion of the case 13 corresponding to the second portion 132 of the module 130 as opposed to the first portion 131 of the battery module 130 corresponding to the upper portion of the case 13 in this embodiment. As less heat is transferred from the second or bottom portion 132 than the upper or first portion 131, and as more heat is generated at the connecting end 30 than the opposed end 32 of the cells 10, a more uniform temperature distribution is achieved. This provides a more efficient, longer-lasting battery module 130 and cells 10. Accordingly, specific temperature differentials within the cells 10 are accommodated for by providing the initial inlet portion 150 of the conduit 15, which is substantially adjacent to the inlet 17, at the location in the battery module 130, coincident with the connecting end 30 of the cells 10 and providing the outlet portion 160 of the conduit 15 at the location of the second portion 132 of the battery module 130 coincident with the opposed ends 32 of the cells.

As shown in FIG. 2, the conduit 15 preferably loops at least twice, and preferably additional times, to create a serpentine path 170 along a plane which is perpendicular to the lateral direction $A_D$. In the preferred embodiment, the serpentine path 170 is contained in the cooling plate 16 which defines the plane perpendicular to the lateral direction $A_D$ and parallel to the longitudinal direction $L_D$. The inlet portion 150 would form the beginning of the path 170 and the outlet portion 160 would form the end of the path 170. It is understood that the second conduit 15' in the second cooling plate 16' would have a similar path 170.

In a preferred embodiment, the cell support 102 in the functional containment area 101 comprises a plurality of slots, as shown generally by reference numeral 110. Each slot 110 may contain one or more battery cells 10. In a preferred embodiment, each slots 110 contain one battery cell 10 each and supports or holds the cells 10 in the inserted position.

More preferably, the slots 110 have an internal surface area, as shown generally by reference numeral 113, which compliments the external surface area 120 of the cells 10. In this way, the contact surface area between the internal surface 113 of the slots 110 and the external surface 120 of the cells 10 can be maximized. In a further preferred embodiment, the slots 110 have articulations, as shown generally by reference numeral 18, which are complementary to the shape of the cells 10 and, in particular, the taper 12 of the cells 10. In this way, a relatively precise mechanical support is also provided by each of the slots 110 for each of the cells 10. This is particularly of benefit when the battery module 130 is mobile, such as in an automobile, and subject to vibrations and bumps. In a preferred embodiment, the articulations 18 form a serrated edge on each side of the battery module case 13. In this way, the plurality of slots 110 can hold the battery cells 10 in an inserted position with the connecting end 30 of each battery cell 10 aligned with the connecting ends 30 of the other cells 10 and coincident with the first portion 131 of the battery module 130 corresponding to the upper portion of the plate 16 and case 13 in this embodiment.

In a further preferred embodiment, the slots 110 extend in the lateral direction, shown generally by reference numeral $A_D$. The cooling plates 16 are arranged in a plane substantially perpendicular to the lateral direction $L_D$. The first cooling plate 16 is associated with a corresponding first end 111 of the slots 110 and the second cooling plate 16' is associated with a corresponding second end 112 of the slots 110, shown in FIG. 1. The cell support 102, in a preferred embodiment, comprise the plurality of slots 110 to hold the substantially rectangularly shaped cells 10 with the connecting ends 30 aligned in the longitudinal direction $L_D$ and extending in the lateral direction $A_D$. The cooling plates 16, 16' thus are substantially perpendicular to the lateral direction $A_D$ in which the rectangularly shaped cells 10 extend.

In a preferred embodiment, the slots 110 comprise cross members 19 which link the two sides 111, 112 of the slots 110 and also link the two cooling plates 16, 16' of the case 13. The cross members 19 preferably extend between each of the cells 10 to form the slots 110. The cross members 19 preferably are made of a heat-conducting material, such as aluminum or ceramic, and, the slots 110 have interior surfaces 113 which are in good thermal contact with the cells 10 as indicated above. In this way, good thermal contact can be made between the exterior surface 120 of the cells 10, the internal surface 113 of the slots 110, the cross members 19, the cooling plate 16, and the fluid 8 in the conduit 15. In this way, the battery module 130 comprises a system, as shown generally by reference numeral 100, to cool the cells 10, such that more heat is removed from the hotter areas of the cells 10 corresponding to the connecting ends 30, and less heat is removed from the cooler areas of the cells 10, corresponding to the opposed end 32 in order to provide a more uniform temperature distribution in the battery module 130.

The cells 10 used in the present invention, in one embodiment, are preferably thin and mostly rectangular in shape, as shown generally in FIG. 3. As indicated above, each side of the cells 10 preferably have a taper 12. The shape of the taper 12 is complementary to the articulations 18 of the slots 110 in the battery module case 13. In the preferred embodiment, as illustrated in FIGS. 1, 2 and 3, the terminals 11, on the connecting end 30 of the cells 10 are preferably located on the same short narrow face of the cell 10, and the cell 10, is oriented in the slots 110 in the battery module case 13 with the terminals 11 at the top. In this way, the battery cells 10 are held in the inserted position with the connecting end 30 aligned with each of the battery cells 10 and coincident with the first portion 131 of the battery module 130 which, in this embodiment, corresponds to the upper portion of the battery case 13. The cells 10 are preferably oriented in an alternating fashion, such that, rather than all of the positive terminals $11p$ being on the left side of the slots 110 and all of the negative terminals $11n$ being on the right side of the slots 110, for example, the line of terminals 11 along one edge of the slots 110 would alternate positive $11p$, negative $11n$, positive $11p$, negative $11n$, and so forth. The battery cells 10 are preferably lithium ion based battery cells 10.

It is understood that the battery cells 10 may be of any type, but would typically be of a type which generate considerable heat. For instance, the battery cells 10 may be preferably lithium ion polymer cells, but other types of battery cells which generate heat and/or have a low thermal conductivity could be particularly useful with the cooling system 100 of the present invention. The battery module 130 preferably has a total capacity in excess of 1 MWh. Furthermore, the present invention is not limited by any particular application, but could be used in any type of application where heat generation and heat transfer is challenging, for example in large batteries like those used in electrical vehicles or grid energy management.

Figure 4:
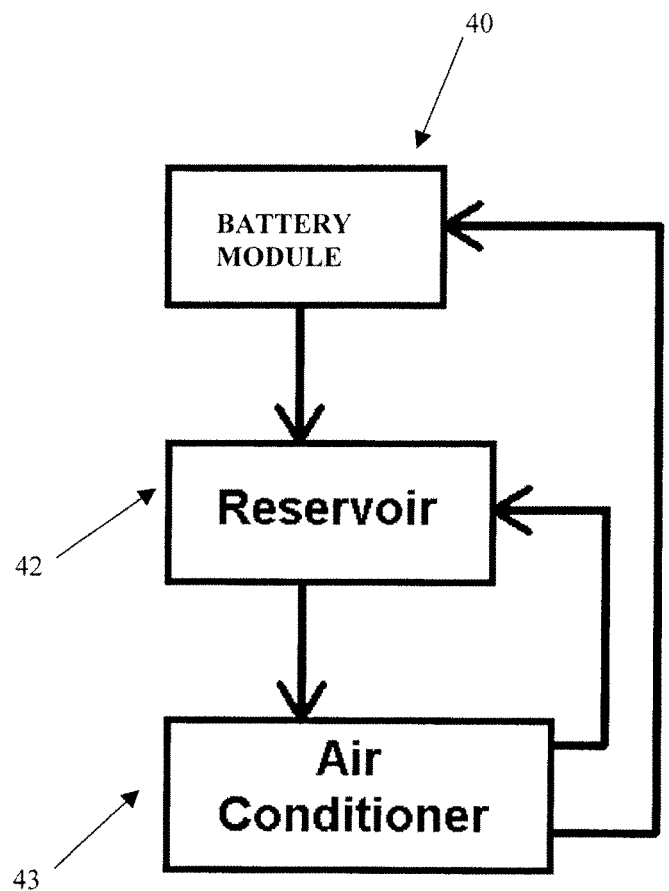
FIG. 4 is a flow diagram showing one configuration whereby cooling fluid is cooled by a vehicle's air conditioner prior to entering the battery module case all of which are mobile.

In a preferred embodiment, where the system 10 is contained in a hybrid electric or electric vehicle (not shown), the cooling fluid can be water or any other type of aqueous fluid. In a second preferred embodiment, the vehicle may contain an air conditioning unit, as shown generally by reference numeral 43 in FIG. 4, and the same refrigerant used by the vehicle's air conditioner 43 to cool air can also be used as the cooling fluid 8 in the cooling system 100 of the battery module 130. As also illustrated in FIG. 4, the refrigerant or cooling fluid 8 may travel from a reservoir 42 to the air conditioning unit 43. There, in the air conditioning unit 43, it may travel through the various components of the air conditioning unit 43, such as the filter, compressor, etc. and it is chilled or cooled. However, rather than entering the evaporator and absorbing heat from the air in the vehicle, the chilled coolant fluid 8 exits the air conditioning unit 43 and travels to the battery module 130 where the chilled fluid 8 enters through the common inlet 17c to the inlets 17, 17' of the conduits 15, 15' to cool the cooling plates 16 and the cells 10 in the battery module 130. In this embodiment, where the battery module 130 is in a vehicle, it is understood that the cooling system 100 including the module 130, the reservoir 42 and the air conditioning unit 43 are all mobile.

In the preferred embodiment where the conduits 15, 15' are contained in the cooling plates 16, 16', the cooling plates 16, 16' will cool the cells 10 held in the slots 110 in the inserted position. The chilled coolant 8 will initially pass through the inlet portions 150 of the cooling conduits 15, 15' to cool the warmer first portion 131 of the battery module 130 corresponding to the upper portion of the case 13 in the present embodiment. The warmed refrigerant 8 will pass through the cooler second portion 132 of the battery module 130, which is adjacent the outlet 20 and also corresponds to the second portion 132 of the battery module 130 holding the opposed ends 32 which generates less heat. In this way, more uniform temperature distribution in the battery module 130 is achieved. The warmed coolant 8 will then exit the battery module 130 through the common outlet 20c to return to the reservoir 42.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

What is claimed is:

1. A system for cooling a battery module having a plurality of individual battery cells, each cell having electrical terminals at an electrical connecting end that is opposite an opposed end, said system comprising:
    a plurality of substantially parallel thermally conductive slots, each of said slots extending generally in a lateral direction for holding said battery cells in an inserted position with the connecting ends aligned with the connecting end of each other battery cell in a longitudinal direction and at a first portion of the battery module, wherein each of the slots has an internal surface that complements an opposing external surface of each of the cells;
    a first cooling plate associated with a first end of the plurality of slots, arranged in a plane perpendicular to the lateral direction, and extending along the longitudinal direction; and
    a second cooling plate associated with a second end of the plurality of slots opposite from the first end, arranged in a plane perpendicular to the lateral direction, and extending along the longitudinal direction;
    wherein the first cooling plate contains an embedded first cooling conduit extending along the longitudinal direction, said first cooling conduit having a first inlet for receiving chilled coolant and a first inlet portion substantially adjacent the first inlet, said first cooling conduit in thermal contact with said cells;
    wherein the second cooling plate contains an embedded second cooling conduit extending along the longitudinal direction, said second cooling conduit having a second inlet for receiving chilled coolant and a second inlet portion substantially adjacent the second inlet, said second cooling conduit in thermal contact with said cells;
    wherein the first inlet portion extends in the longitudinal direction across the first end of the plurality of slots and coincident with the first portion of the battery module so as to cool the connecting ends of each of the battery cells before cooling other portions of the battery cells; and
    wherein the second inlet portion extends in the longitudinal direction across the second end of the plurality of slots and coincident with the first portion of the battery module so as to cool the connecting ends of each of the battery cells before cooling other portions of the battery cells.

2. The system as defined in claim 1 wherein the battery module has a second portion, remote from the first portion, such that when said battery cells are in the inserted position with the connecting end aligned with each other battery cell and coincident with the first portion of the battery module, the opposed ends of the battery cells are coincident with the second portion of the battery module;
    wherein the first cooling conduit comprises a first outlet for expelling coolant that has been used to cool the battery cells; and
    wherein the first cooling conduit has a first outlet portion substantially adjacent the first outlet and extending in the longitudinal direction across the plurality of slots along the second portion of the battery module so as to cool the opposed ends of the battery cells after the connecting ends of each of the battery cells have been cooled.

3. The system as defined in claim 2 wherein the first cooling conduit has a serpentine path extending across the slots at least three times along a plane perpendicular to the lateral direction comprising the first inlet portion at a beginning of the serpentine path and the first outlet portion at an end of the serpentine path.

4. The system as defined in claim 1 further comprising:
    a case for containing the plurality of slots, said case formed by the first cooling plate and the second cooling plate, and, said case further comprising a first end plate and a second end plate, said first and second end plates extending substantially parallel to the lateral direction and adjacent to the first and second cooling plates.

5. The system as defined in claim 4 wherein the first cooling conduit is integrally formed in the first cooling plate and the second cooling conduit is integrally formed in the second cooling plate.

6. The system as defined in claim 1, further comprising:
a cell support for holding said battery cells in an inserted position with the connecting ends of the cells aligned in the longitudinal direction and extending along the lateral direction;
wherein the cell support comprises the plurality of substantially parallel thermally conductive slots, each of said slots extending generally in the lateral direction for holding said battery cells in the inserted position with the connecting ends aligned in the longitudinal direction; and
wherein the first cooling conduit is in thermal contact with the plurality of slots.

7. The system as defined in claim 6,
wherein each slot receives only one cell;
wherein the internal surface of each of the slots is in contact with at least a part of the external surface of the cells; and
wherein each slot comprises cross members extending across the battery module in the lateral direction, and, said cross members are in thermal contact with the first cooling conduit to conduct heat from the internal surface of the slots in contact with the exterior surface of the cells to the first cooling conduit.

8. The system as defined in claim 6 wherein the slots are substantially rectangularly shaped with tapered edges which mate with corresponding articulations in the slots.

9. The system as defined in claim 6 wherein the cells in the inserted position stand substantially upright in the slots with the terminals located along the upper portion of the battery module.

10. The system as defined in claim 6 further comprising:
a case for containing the battery module, said case containing the plurality of battery cells;
wherein the cell support holds the battery cells in the inserted position with the connecting end of each battery cell aligned with the connecting end of each other battery cell and coincident with a first portion of the case; and
wherein the first portion of the case coincides with the first inlet portion of the first cooling conduit so as to cool the first portion of the case before cooling other portions of the case.

11. The system as defined in claim 1 further comprising:
an air conditioner to chill the coolant and provide the chilled coolant to the first cooling conduit;
wherein the air conditioner also chills coolant to cool air; and
wherein the system and the air conditioner are mobile.

12. The system as defined in claim 11 comprising:
a reservoir for storing coolant used by the system including the air conditioner.

13. The system as defined in claim 1 wherein the battery cells comprised in the battery module are lithium ion battery cells.

14. The system as defined in claim 4 wherein the first inlet and the second inlet are in fluid communication with a common inlet located in the first end plate.

15. The system as defined in claim 4 wherein the first cooling conduit has a first outlet portion substantially adjacent the first outlet and extending in the longitudinal direction across the plurality of slots along the second portion of the battery module so as to cool the opposed ends of the battery cells after the connecting ends of each of the battery cells have been cooled;
wherein the second cooling conduit has a second outlet portion substantially adjacent the second outlet and extending in the longitudinal direction across the plurality of slots along the second portion of the battery module so as to cool the opposed ends of the battery cells after the connecting ends of each of the battery cells have been cooled; and
wherein the first outlet and the second outlet are in fluid communication with a common outlet located in the first end plate.

16. The system as defined in claim 10, further comprising:
a second cooling plate associated with a second end of the plurality of slots opposite from the first end, arranged in a plane perpendicular to the lateral direction, and extending along the longitudinal direction;
wherein the second cooling plate contains an embedded second cooling conduit extending along the longitudinal direction, said second cooling conduit having a second inlet for receiving chilled coolant and a second inlet portion substantially adjacent the second inlet, said second cooling conduit in thermal contact with said cells; and
wherein the second inlet portion extends in the longitudinal direction across the second end of the plurality of slots and coincident with the first portion of the battery module so as to cool the connecting ends of each of the battery cells before cooling other portions of the battery cells.

17. The system as defined in claim 16 further comprising a first end plate and a second end plate, said first and second end plates extending substantially parallel to the lateral direction and adjacent the first and second cooling plates.

18. The system as defined in claim 17, wherein the first inlet and the second inlet are both in fluid communication with a common inlet in the first end plate for receiving chilled cooling fluid.

19. The system as defined in claim 18 wherein the first cooling conduit has a first outlet portion substantially adjacent the first outlet and extending in the longitudinal direction across the plurality of slots along the second portion of the battery module so as to cool the opposed ends of the battery cells after the connecting ends of each of the battery cells have been cooled;
wherein the second cooling conduit has a second outlet portion substantially adjacent the second outlet and extending in the longitudinal direction across the plurality of slots along the second portion of the battery module so as to cool the opposed ends of the battery cells after the connecting ends of each of the battery cells have been cooled; and
wherein the first outlet and the second outlet are in fluid communication with a common outlet located in the first end plate.

20. The system as defined in claim 2 wherein the second cooling conduit comprises a second outlet for expelling coolant that has been used to cool the battery cells; and
wherein the second cooling conduit has a second outlet portion substantially adjacent the second outlet and extending in the longitudinal direction across the plurality of slots along the second portion of the battery module so as to cool the opposed ends of the battery cells after the connecting ends of each of the battery cells have been cooled.

21. The system as defined in claim 20, wherein the second cooling conduit has a serpentine path extending across the slots at least three times along a plane perpendicular to the lateral direction comprising the second inlet portion at a beginning of the serpentine path and the second outlet portion at an end of the serpentine path.

* * * * *